United States Patent
Woods et al.

(10) Patent No.: US 12,457,550 B1
(45) Date of Patent: Oct. 28, 2025

(54) SYSTEM, METHOD, AND COMPUTER PROGRAM FOR MANAGING A QUALITY OF 5G NETWORK SLICE SERVICES

(71) Applicant: Amdocs Development Limited, Limassol (CY)

(72) Inventors: Ashley Lewis Woods, Swindon (GB); Mark Pond, St Albans (GB); Andrew Baxter, Chippenham (GB); Luke James Parker, Ocean Grove (AU)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 542 days.

(21) Appl. No.: 17/884,414

(22) Filed: Aug. 9, 2022

(51) Int. Cl.
*H04W 48/18* (2009.01)
*H04W 16/18* (2009.01)
*H04W 24/10* (2009.01)
*H04W 28/02* (2009.01)

(52) U.S. Cl.
CPC ........... *H04W 48/18* (2013.01); *H04W 16/18* (2013.01); *H04W 24/10* (2013.01); *H04W 28/0268* (2013.01)

(58) Field of Classification Search
CPC ..... H04W 48/18; H04W 16/18; H04W 24/10; H04W 28/0268; H04W 76/28; H04W 28/24
See application file for complete search history.

(56) References Cited

U.S. PATENT DOCUMENTS

| | | | |
|---|---|---|---|
| 2021/0160763 A1* | 5/2021 | Lou | H04W 28/0289 |
| 2022/0201556 A1* | 6/2022 | Yang | H04W 28/24 |
| 2023/0370892 A1* | 11/2023 | Ramaswamy | H04W 76/28 |

* cited by examiner

*Primary Examiner* — Ayaz R Sheikh
*Assistant Examiner* — Mang Boi Thawng
(74) *Attorney, Agent, or Firm* — Zilka-Kotab, P.C.

(57) ABSTRACT

As described herein, a system, method, and computer program are provided for managing quality of 5G network slice services. A latency issue in a 5G network is detected. Information associated with the 5G network is collected. The information is analyzed to determine a network slice provisioned in the 5G network having a quality requirement that is not met as a result of the latency issue. The network slice is reengineered, using the information associated with the 5G network. The reengineered network slice is deployed in the 5G network.

16 Claims, 6 Drawing Sheets

SYSTEM, METHOD, AND COMPUTER PROGRAM FOR MANAGING A QUALITY OF 5G NETWORK SLICE SERVICES

FIELD OF THE INVENTION

The present invention relates to management of 5G network slice services.

BACKGROUND

Service Providers (SPs) are now rolling-out new software programmable networks. These new programmable networks facilitate the creation of new 5G network slice services. The expectation is that these new slice services will play a critical role in how SPs monetize 5G. Ultra Reliable, Low Latency Connection (URLLC) is one of the defined services types of this new standard. To monetize and provide competitive differentiation, the SP must be able to assure the Quality of Service (QOS) and provide best in class Quality of Experience (QoE).

One of the key causes of network slice service, including URLLC, QOS/QoE degradation are issues in the transport network between the 5G cell site network function (gNB) and the Edge/Core. However, since current SP operational practices focus on investigating and fixing the root cause, which is complex and mostly a human centric time-consuming process (hours/days/weeks), it is a challenge to continually assure QoS and QoE.

There is thus a need for addressing these and/or other issues associated with the prior art.

SUMMARY

As described herein, a system, method, and computer program are provided for managing quality of 5G network slice services. A latency issue in a 5G network is detected. Information associated with the 5G network is collected. The information is analyzed to determine a network slice provisioned in the 5G network having a quality requirement that is not met as a result of the latency issue. The network slice is reengineered, using the information associated with the 5G network. The reengineered network slice is deployed in the 5G network.

DETAILED DESCRIPTION

Figure 1:
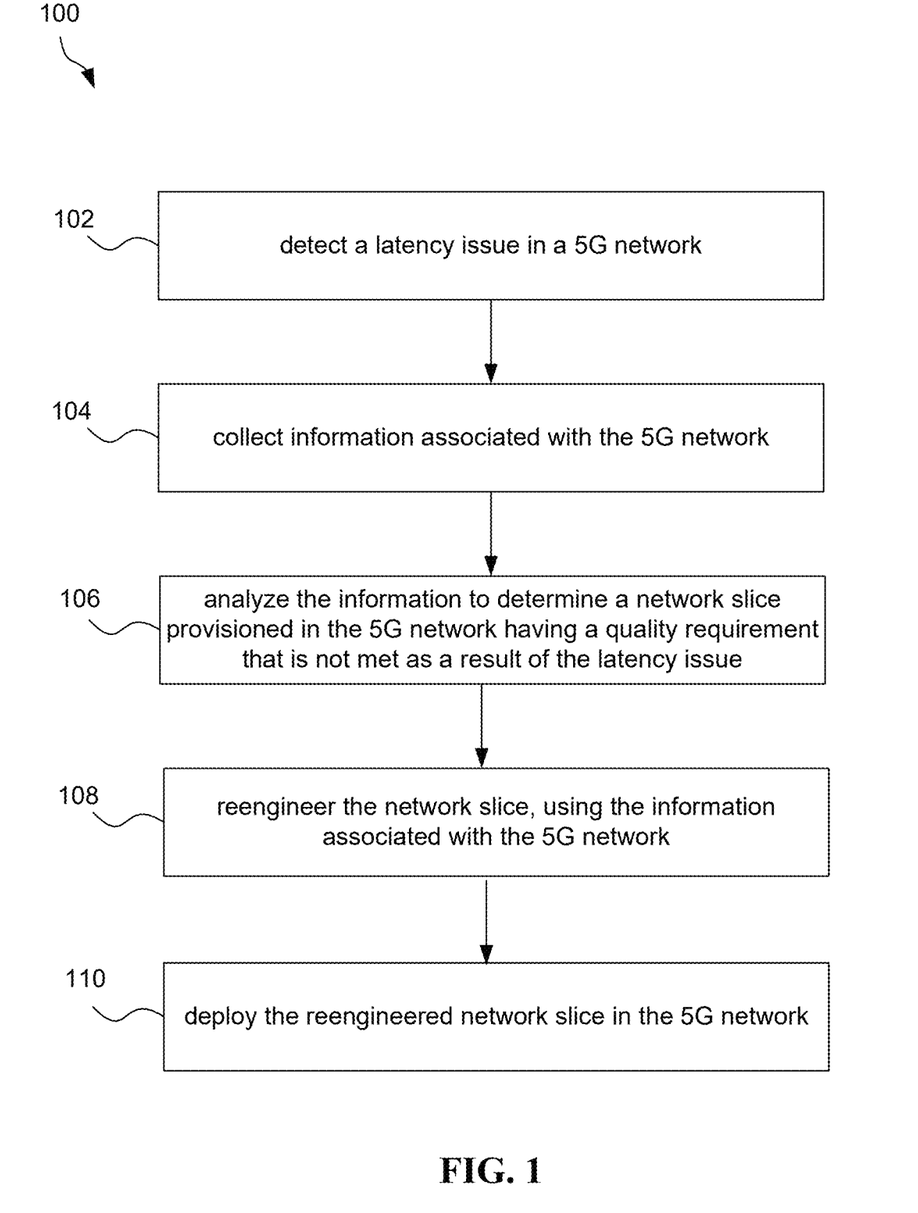
FIG. 1 illustrates a method for managing a quality of a network slice in a 5G network, in accordance with one embodiment.

FIG. 1 illustrates a method 100 for managing a quality of a network slice in a 5G network, in accordance with one embodiment. The method 100 may be performed by a network slice service management platform which may include one or more computer systems, such as the computer systems described below with reference to FIGS. 4 and/or 5.

The network slice service management platform may include various hardware and/or software resources which perform the method 100, such as processors, memory, user interfaces, machine learning algorithms, etc., which will be described in more detail below. The network slice service management platform may interface a 5G network on which a network slice service is provided. One or more network slices (i.e. created by the network slice service) may accordingly be deployed to the 5G network. Each network slice may include multiple instances deployed on different cell sites within the 5G network.

In operation 102, a latency issue in a 5G network is detected. The latency issue refers to any current or anticipated latency degradation in the 5G network. For example, the latency issue may be a transport latency issue and/or a network slice latency issue.

In various embodiments, the latency issue may be detected by testing the 5G network, measuring parameters of the 5G network, monitoring the 5G network, etc. For example, the latency issue may be detected by monitoring the 5G network and identifying one or more network parameters indicative of the latency issue.

In operation 104, information associated with the 5G network is collected. For example, the information may be collected responsive to detecting the latency issue. The information may include any data capable of being used to determine any network slices provisioned in the 5G network that are affected by the latency issue as well as capable of being used to reengineer the network slices when needed.

In one embodiment, the information may include, in part, a profile (e.g. specification) defined for the network slice that indicates a quality requirement of the network slice (e.g. a quality of service (QOS) requirement, a quality of experience (QoE) requirement, etc.). In another embodiment, the information may include metrics associated with a cellular radio access network (RAN). In another embodiment, the information may include information defining a structure of the 5G network. In another embodiment, the information may include metrics associated with resource utilization in the 5G network.

In operation 106, the information is analyzed to determine a network slice provisioned in the 5G network having a quality requirement that is not met as a result of the latency issue. For example, the network slice profile and network metrics mentioned above may be analyzed to determine at least one network slice provisioned in the 5G network that has a quality requirement that is not met (currently or anticipated) as a result of the latency issue.

The information may further be analyzed to derive information that can be used to reengineer the network slice (e.g. to allow the quality requirement of the network slice to be met by the 5G network). In some embodiments, the information may further be analyzed to verify that the latency issue is a transport latency issue, to identify a set of neighboring cell site locations that have an overlapping coverage area, to verify that a quality at the set of neighbor cell site locations adheres to a quality requirement of the network slice, to determine current and predicted traffic for a current site experiencing the latency issue and for the set of neighbor cell site locations, and/or to determine resources in the 5G network that are available for use in reengineering the network slice.

In operation 108, the network slice is reengineered, using the information associated with the 5G network. For example, in the embodiment above where the information is analyzed to determine resources in the 5G network that are available for use in reengineering the network slice, the network slice may be reengineered based on the resources in the 5G network determined to be available.

In one embodiment, reengineering the network slice may include increasing use by the network slice of neighbor cell site locations that adhere to a quality requirement of the network slice (e.g. increasing a size of the network slice instance at the neighbor site location), and decreasing use by the network slice of a current site experiencing the latency issue (e.g. decreasing a site of the network slice instance at the current site). In an embodiment, reengineering the network slice may include decreasing resources of the neighbor cell site locations that are assigned to other network slices in order to allow the neighbor cell site locations to adhere to a quality requirement of the network slice. As an option, use by the other network slices of the current site experiencing the latency issue may be increased when the decreasing of the resources of the neighbor cell site locations that are assigned to the other network slices results in insufficient capacity for the other network slices.

In operation 110, the reengineered network slice is deployed in the 5G network. Deploying the reengineered network slice to the 5G network refers to applying changes to the network in accordance with the reengineered network slice. Accordingly, the reengineered network slice may be created in the 5G network.

As an option, an outcome of deploying the reengineered network slice in the 5G network may be monitored. This monitoring may determine whether the quality requirement of the network slice is met by the 5G network. If the quality requirement is not met, operations 104-110 may be repeated to reengineer the network slice based on current network information.

To this end, a quality of a network slice in a 5G network may be managed in accordance with a quality requirement defined for the network slice and based on a current state (e.g. measurements, architecture, etc.) of the 5G network. It should be noted that while reference is made above to "a" network slice, the method 100 may equally be applied for any or all network slices provisioned in the 5G network.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
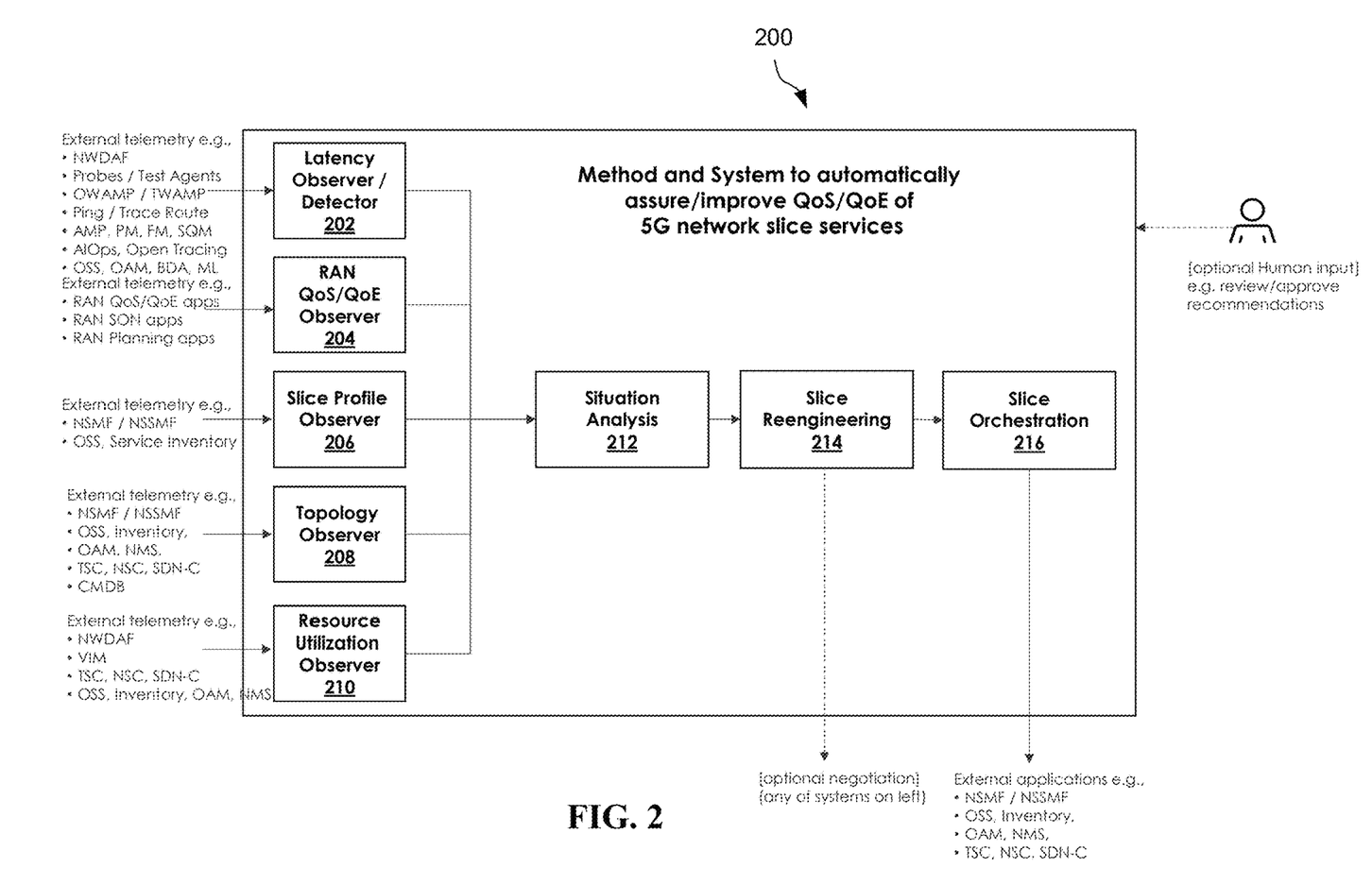
FIG. 2 illustrates a block diagram of the functions used to manage a quality of a network slice in a 5G network, in accordance with one embodiment.

FIG. 2 illustrates a block diagram 200 of the functions used to manage a quality of a network slice in a 5G network, in accordance with one embodiment. As an option, the functions may be implemented in the context of the details of the previous figure and/or any subsequent figure(s). For example, the functions may be executable components of the network slice service management platform mentioned above. Of course, however, the functions may be implemented in the context of any desired environment. Further, the aforementioned definitions may equally apply to the description below.

As shown, 5G network information collected by various observing functions 202-210 are input to a situation analysis function 212. In an embodiment, a latency observer/detector 202 monitors telemetry from the 5G network that directly or indirectly correlates to a current or pending issue that provides indication that there is a transport and/or network slice latency issue. Telemetry examples collected by the latency observer/detector 202 include, but are not limited to:
  Measurements from a NWDAF (Network Data Analytics Function)
  Measurements from network probes and test agents
  Measurements from network protocols e.g., OWAMP (One-Way Active Measurement Protocol), TWAMP (Two-Way Active Measurement Protocol), Ping, Trace Route
  Measurements from APM (Application Performance Monitoring) tooling
  Measurements from AIOps (artificial intelligence for IT operations) application trace measurements e.g., Open Tracing, Jaeger
  Measurements from network providers' network function/element, OSS (Operational Support System), OAM (Operations and Management) system
  Measurements/Events from PM (Performance Monitoring), SQM (Service Quality Management) or FM (Fault Management) system
  BDA (Big Data Analytics)/ML (Machine Learning) platform In an embodiment, a RAN QoS/QoE observer 204 ingests telemetry that directly or indirectly provides details of cellular radio access coverage, capacity, utilization and QoS/QoE. Telemetry examples collected by the RAN QoS/QoE observer 204 include, but are not limited to:
  RAN QoS/QoE monitoring applications
  RAN SON (Self Organizing/Optimizing Network) applications
  RAN Planning applications In an embodiment, a slice profile observer 206 ingests telemetry information related to Network Slice Profile and/or SLS (Service Level Specification) for each instance of network slices provisioned in the 5G network, including URLLC and non-URLLC services. Details include, for example, expected QoS expectations for latency, bandwidth, etc. Telemetry sources for the slice profile observer 204 include but are not limited to:
  NSMF (Network Slice Management Function)
  OSS (Operational Support Systems) e.g., Service inventory system In an embodiment, a topology observer 208 ingests network topology/architecture telemetry, including but not limited to:
  Network slice composition i.e. how network functions are inter-connected to provide each end-to-end network slice instance (also known as service function chaining)
  Understanding the dependencies between resources e.g. how a virtualized/containerized network consumes resource from virtualized/cloud infrastructure layer (storage/compute/memory), or how a transport segment consumes resources of underlying transport technology layer Sources of the topology telemetry may include, but are not limited to:
  NSMF (Network Slice Management Function), NSSMF (Network Subnet Slice Management Function)
  OSS (Operational Support Systems) e.g. Inventory system, equipment vendors NMS (Network Management System), OAM (Operations & Management) system
  TSC (Transport Slice Controller), NSC (Network Slice Controller), SDN-C (Software Definable Network-Controller)
  CMDB (Configuration Management Data Base)

In an embodiment, a resource utilization observer 210 ingests telemetry that directly or indirectly provides details of physical and/or virtual NF (Network Function) resource utilization, and where NF is virtualized the telemetry that directly or indirectly provides details of virtualized/containerized network function infrastructure utilization. Telemetry examples include, but are not limited to:

NWDAF (Network Data Analytics Function)

VIM (Virtual Infrastructure Manager)

TSC (Transport Slice Controller), NSC (Network Slice Controller), SDN-C (Software Definable Network-Controller)

OSS (Operational Support Systems) e.g. Inventory system, equipment vendors NMS (Network Management System), OAM (Operations & Management) system As noted above, the situation analysis function 212 receives the 5G network information collected by the various observing functions 202-210. The situation analysis function 212 operates to autonomously act on current/anticipated telemetry directly or indirectly indicating a current/anticipated situation that results in a latency degrade, and then performs the following analyses activities:

(1) Verify that the reported degradation is service impacting i.e. exceeds the service profile limit for a network slice, also commonly known as SLS (Service Level Specification), SLA (Service Level Agreement), SLO (Service Level Objective), the Service Intent, etc.

(2) Combines/overlay knowledge of latency degradation with knowledge of network slice composition and network topology to verify that the quality problem is localized to a xHaul transport issue between the 5G gNB (gNodeB) and the edge/core.

(3) Uses knowledge of network topology and radio coverage telemetry to identify the set of neighboring cell site locations that have an overlapping coverage area (radio footprint).

(4) Verifies that the radio QoS/QoE at the set of neighbor cell site locations adhere to the service profile.

(5) Reviews the current and predicted network slices traffic loading for all network slice instances (URLLC network slice services, and non-URLLC network slice services) for the site with the degradation and for the set of neighboring cell sites with good QoS/QoE.

(6) Reviews/verifies the resources that are available to support end-to-end network slice reengineering e.g. RAB (Radio Access Bearer), physical NF resources, virtual infrastructure resources, xHaul transport network resources, etc.

Based on a result of the analysis made by the situation analysis function 212, a slice reengineering function 214 calculates the reengineering of network slice instances, which may include but is not limited to:

(1) At neighboring sites, network slice:

Is increased to meet current/predicted traffic load, a process of increasing e.g. RAB, gNB, xHaul, Edge/Core UPF/AMF resources.

Modification is made to beam forming policies to increase overlapping coverage/capacity;

Modification is made to network slices RAB attachment policies; and/or (2) At the site with the latency issue, network slice:

Capacity is decrease to minimal levels, to support traffic that cannot be handled by overlapping neighbor site locations;

Modification is made to beam forming policies to decrease overlapping coverage/capacity; and/or Modification is made to network slices RAB attachment policies.

If insufficient capacity exists to expand a URLLC network slice on neighboring sites, then decrease resources assigned to low-priority non-URLLC network slice. Process is similar to above.

If sufficient capacity no longer exists to carry non-URLLC traffic at neighbor sites, increase capacity of non-URLLC network slice at the site with latency issue. Process is similar to above.

Further, a slice orchestration function 216 facilitates the process of applying the changes for the reengineered network slice to the live 5G network, and monitoring the outcome. The changes may be made to, but are not limited to:

NSMF (Network Slice Management Function), NSSMF (Network Subnet Slice Management Function)

OSS (Operational Support Systems) e.g. Inventory system, equipment vendors NMS (Network Management System), OAM (Operations & Management) system TSC (Transport Slice Controller), NSC (Network Slice Controller), SDN-C (Software Definable Network-Controller)

RIC (Radio Interface Controller)

Additional Embodiments

It should be noted that the network slice management is not limited to the specific URLLC service type, but can apply to any/all variations of network slice service types that need to ensure latency requirements for respective network slices are within a defined specification.

During network slice reengineering, the process optionally can include activities to negotiate with external systems, e.g. to check and secure availability of resources needed to fulfill a new intent. These systems include, but are not limited to any of the functions 202-210 described above.

During network slice reengineering, the process optionally includes logic that includes, but is not limited to inter-policy coordination, e.g. to manage conflicts between coexisting mitigation actions, based on slice profile policies and priorities.

The process optionally includes support for human interaction, e.g. including but not limited to, reviewing, approving and modifying priorities and proposed reengineered network slice policies/designs.

The situation analysis function 212 may continue to monitor the ongoing situation and health of all network slices, a process that includes but is not limited to:

a) Reengineering the network slice overtime to reflect sessional (e.g., \ daily/weekly) traffic loading/trends.

b) Reengineering the network slice back to an original optimal state once the original root cause of the latency issue has been resolved/fixed.

Figure 3A:
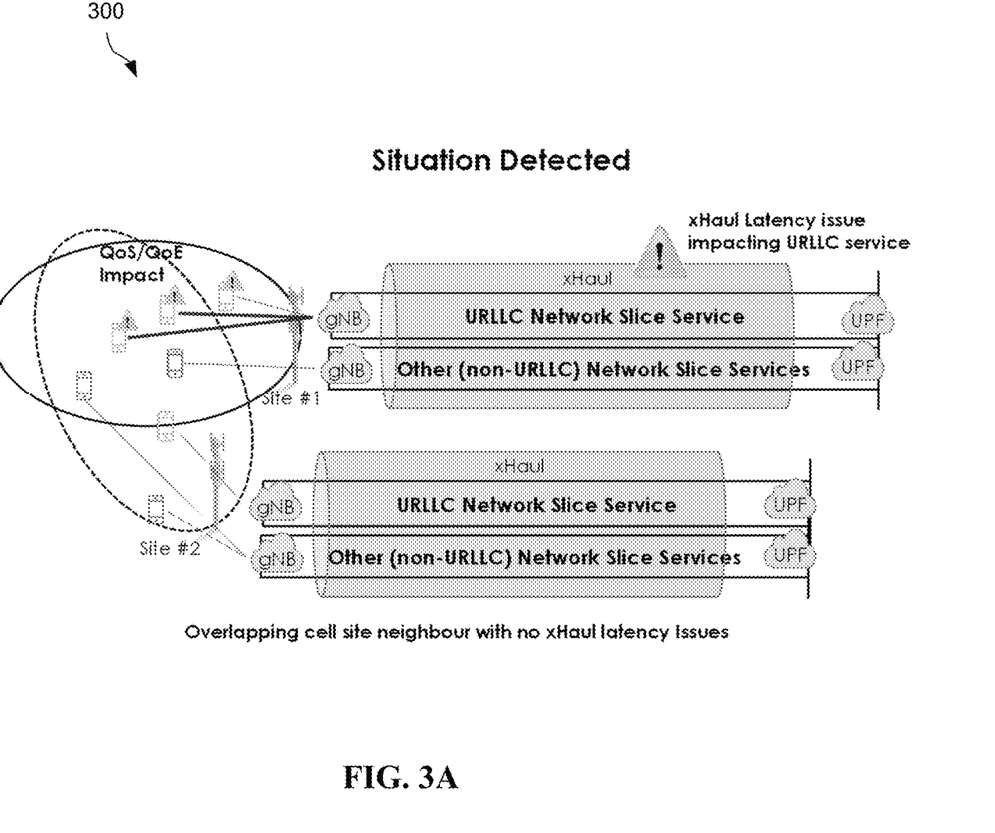
FIG. 3A illustrates a system in which a latency issue affecting a network slice quality has been detected in a 5G network, in accordance with one embodiment.

FIG. 3A illustrates a system 300 in which a latency issue affecting a network slice quality has been detected in a 5G network, in accordance with one embodiment.

As shown, a first URLLC network slice instance and a first non-URLLC network slice instance are configured to use a first site (Site #1) for which a latency issue has been detected and verified as negatively impacting the first URLLC network slice. A second URLLC network slice instance and a second non-URLLC network slice instance are configured to use a second site (Site #2) for which no latency issue has been detected. In the embodiment shown, the first site for which the latency issue has been detected and the second site for which no latency issue has been detected at least partially overlap.

Figure 3B:
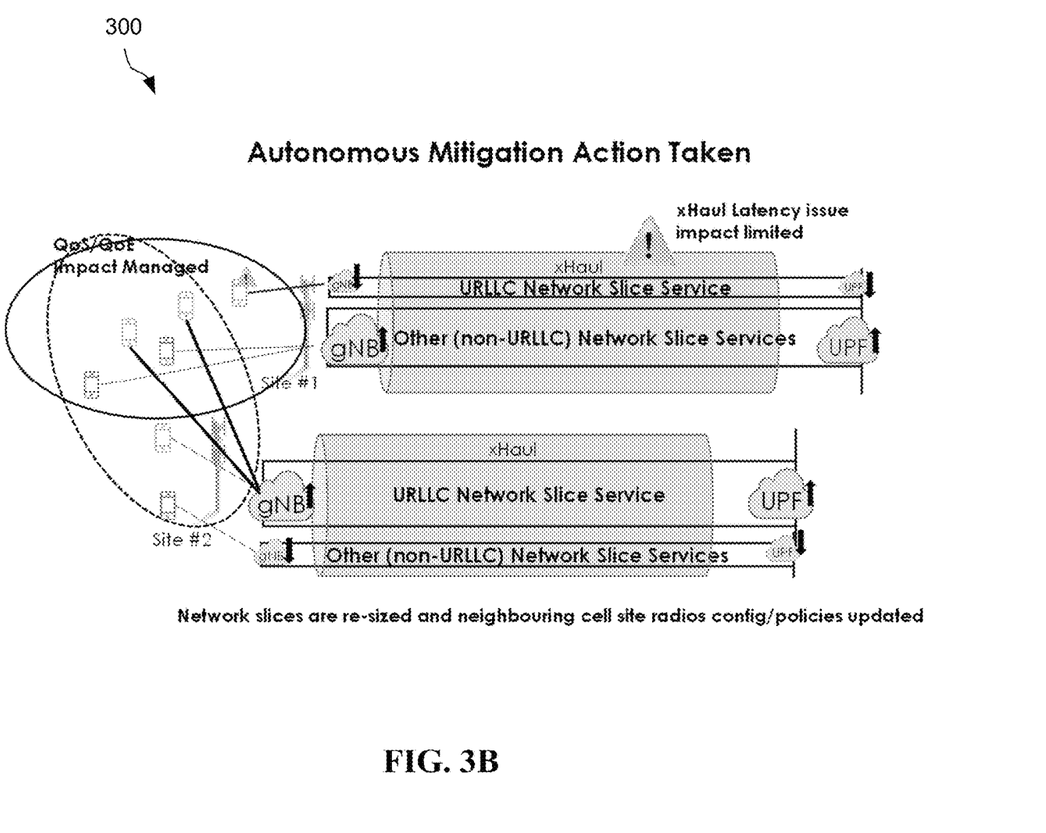
FIG. 3B illustrates the system of FIG. 3A in which the network slice is reengineered and deployed in the 5G network, in accordance with one embodiment.

FIG. 3B illustrates the system 300 of FIG. 3A in which the network slice is reengineered and deployed in the 5G network, in accordance with one embodiment.

Due to the detected latency issue in the first site being verified as negatively impacting the first URLLC network slice instance, the URLLC network slice is reengineered to decrease a size of the first URLLC network slice instance using the first site having the latency issue and to increase a size of the second URLLC network slice instance using the second site that has no latency issue. In addition, due to a lower priority of the non-URLLC network slice and to ensure a quality for the reengineered first URLLC network slice, resources of the second site are released for use by the URLLC network slice. In particular, the non-URLLC network slice is also reengineered to increase a size of the first URLLC network slice instance using the first site having the latency issue and to decrease a size of the second URLLC network slice instance using the second site that has no latency issue. In accordance with the reengineered network slices, neighboring cell site radios configuration/policies are updated.

To this end, embodiments described above automatically assure/improve QoS and/or QoE of 5G URLLC network slices (and other network slices that depend on acceptable latency). The embodiments may automatically reengineer 5G URLLC network slice to assure/mitigate (lessen/circumvent) the impact of transport (xHaul) latency issues. Embodiments may monitor the QoS KPIs (Key Performance Indicators) of the 5G URLLC services and/or underlying transport (xHaul) connection to each 5G cell site network function (gNB), and on detection of an issue impacting latency may automatically orchestrate the reengineering of network slice/traffic to the impacted cell site and neighboring cell sites. The reengineering process may span multiple cell site locations, network functions across RAN (Radio Access Network), TN (Transport Network) and Edge/Core locations. Knowledge of capacity/QoS/QoE at overlapping neighboring cell-sites may be required. Further, re-dimensioning of network slices may be provided to move, where possible, some/all URLLC to mitigate (lessen/circumvent) the impact. On resolution of the underlying cause, the policies may be rewound for optimal configuration of the 5G network.

Figure 4:
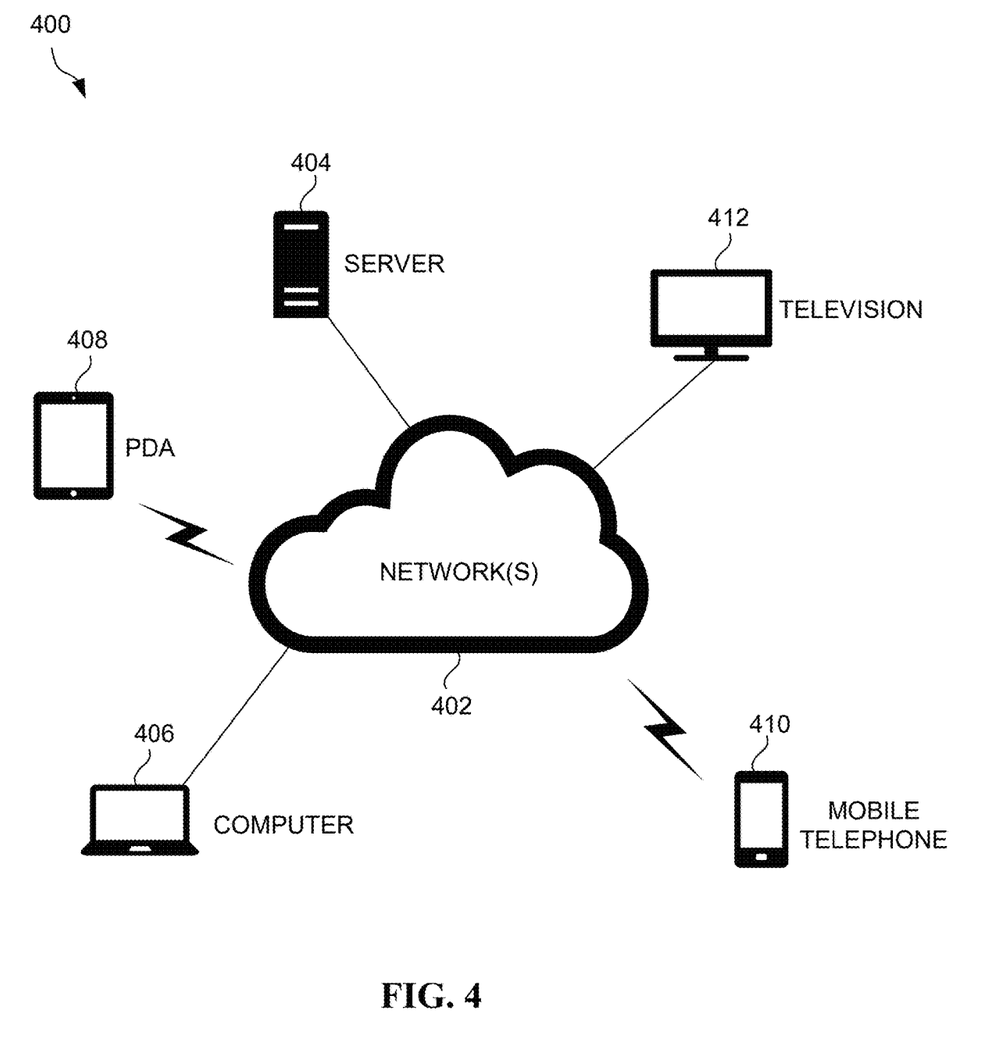
FIG. 4 illustrates a network architecture, in accordance with one possible embodiment.
Figure 5:
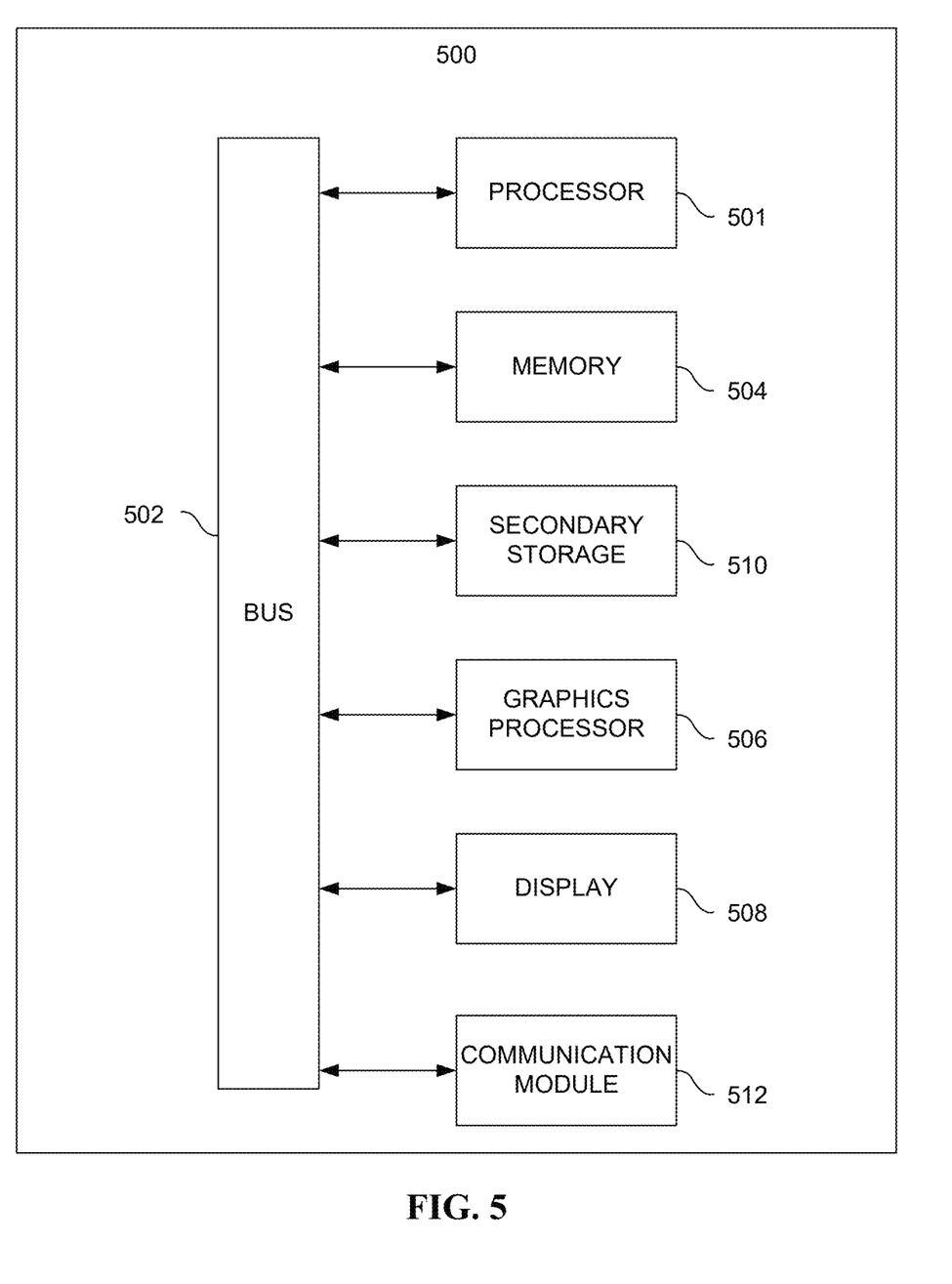
FIG. 5 illustrates an exemplary system, in accordance with one embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware.

Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
   detect a latency issue in a 5G network;
   collect information associated with the 5G network;
   analyze the information to determine a network slice provisioned in the 5G network having a quality requirement that is not met as a result of the latency issue;
   reengineer the network slice, using the information associated with the 5G network; and
   deploy the reengineered network slice in the 5G network;
   wherein the information includes at least one of:
     a profile defined for the network slice that indicates the quality requirement of the network slice,
     metrics associated with a cellular radio access network (RAN),
     information defining a structure of the 5G network, or
     metrics associated with resource utilization in the 5G network.

2. The non-transitory computer-readable media of claim 1, wherein the latency issue in the 5G network includes at least one of a transport latency issue or a network slice latency issue.

3. The non-transitory computer-readable media of claim 1, wherein the quality requirement is at least one of a quality of service (QoS) requirement or a quality of experience (QoE) requirement.

4. The non-transitory computer-readable media of claim 1, wherein the information is further analyzed to:
   verify that the latency issue is a transport latency issue.

5. The non-transitory computer-readable media of claim 4, wherein the information is further analyzed to:
   identify a set of neighboring cell site locations that have an overlapping coverage area.

6. The non-transitory computer-readable media of claim 5, wherein the information is further analyzed to:
   verify that a quality at the set of neighbor cell site locations adheres to a quality requirement of the network slice.

7. The non-transitory computer-readable media of claim 6, wherein the information is further analyzed to:
   determine current and predicted traffic for a current site experiencing the latency issue and for the set of neighbor cell site locations.

8. The non-transitory computer-readable media of claim 7, wherein the information is further analyzed to:

determine resources in the 5G network that are available for use in reengineering the network slice.

9. The non-transitory computer-readable media of claim 8, wherein the network slice is reengineered based on the resources in the 5G network determined to be available.

10. The non-transitory computer-readable media of claim 1, wherein reengineering the network slice includes:
increasing use by the network slice of neighbor cell site locations that adhere to a quality requirement of the network slice, and
decreasing use by the network slice of a current site experiencing the latency issue.

11. The non-transitory computer-readable media of claim 10, wherein reengineering the network slice includes:
decreasing resources of the neighbor cell site locations that are assigned to other network slices in order to allow the neighbor cell site locations to adhere to a quality requirement of the network slice.

12. The non-transitory computer-readable media of claim 11, where in the device is further caused to:
increase use by the other network slices of the current site experiencing the latency issue when the decreasing of the resources of the neighbor cell site locations that are assigned to the other network slices results in insufficient capacity for the other network slices.

13. The non-transitory computer-readable media of claim 1, where in the device is further caused to:
monitor an outcome of deploying the reengineered network slice in the 5G network.

14. A non-transitory computer-readable media storing computer instructions which when executed by one or more processors of a device cause the device to:
detect a latency issue in a 5G network;
collect information associated with the 5G network;
analyze the information to determine a network slice provisioned in the 5G network having a quality requirement that is not met as a result of the latency issue;
reengineer the network slice, using the information associated with the 5G network; and
deploy the reengineered network slice in the 5G network;
wherein the latency issue is detected by monitoring the 5G network and identifying one or more network parameters indicative of the latency issue.

15. A method, comprising:
at a computer system:
detecting a latency issue in a 5G network;
collecting information associated with the 5G network;
analyzing the information to determine a network slice provisioned in the 5G network having a quality requirement that is not met as a result of the latency issue;
reengineering the network slice, using the information associated with the 5G network; and
deploying the reengineered network slice in the 5G network;
wherein reengineering the network slice includes:
increasing use by the network slice of neighbor cell site locations that adhere to a quality requirement of the network slice, and
decreasing use by the network slice of a current site experiencing the latency issue.

16. A system, comprising:
a non-transitory memory storing instructions; and
one or more processors in communication with the non-transitory memory that execute the instructions to:
detect a latency issue in a 5G network;
collect information associated with the 5G network;
analyze the information to determine a network slice provisioned in the 5G network having a quality requirement that is not met as a result of the latency issue;
reengineer the network slice, using the information associated with the 5G network; and
deploy the reengineered network slice in the 5G network;
wherein the information is further analyzed to:
verify that the latency issue is a transport latency issue.

* * * * *